United States Patent

Nouhaud

(10) Patent No.: US 8,402,743 B2
(45) Date of Patent: Mar. 26, 2013

(54) ACTUATING OF A THRUST REVERSER IN A TURBOMACHINE

(75) Inventor: Christophe Claude Philippe Nouhaud, Brie Comte Robert (FR)

(73) Assignee: SNECMA, Paris (FR)

( * ) Notice: Subject to any disclaimer, the term of this patent is extended or adjusted under 35 U.S.C. 154(b) by 946 days.

(21) Appl. No.: 12/489,830

(22) Filed: Jun. 23, 2009

(65) Prior Publication Data

US 2009/0320444 A1    Dec. 31, 2009

(30) Foreign Application Priority Data

Jun. 25, 2008  (FR) .................................... 08 03548

(51) Int. Cl.
*F02K 3/02* (2006.01)

(52) U.S. Cl. ..... 60/226.2; 60/226.3; 60/230; 60/39.281; 60/734; 244/110 B; 239/265.25; 239/265.29

(58) Field of Classification Search ................ 60/226.2, 60/226.3, 734, 39.281, 230; 239/265.25, 239/265.29; 244/110 B, 53 R
See application file for complete search history.

(56) References Cited

U.S. PATENT DOCUMENTS

| | | | | |
|---|---|---|---|---|
| 3,332,234 | A | | 7/1967 | Lavash |
| 3,377,799 | A | * | 4/1968 | Geyer .............................. 60/794 |
| 3,442,218 | A | * | 5/1969 | Wess ........................ 137/565.13 |
| 3,696,895 | A | | 10/1972 | Schaffer et al. |
| 4,458,582 | A | * | 7/1984 | Linton ............................ 91/506 |
| 4,608,822 | A | * | 9/1986 | Fondacci et al. ................ 60/242 |
| 6,598,386 | B2 | * | 7/2003 | Johnson et al. .............. 60/226.2 |
| 6,935,097 | B2 | * | 8/2005 | Eschborn ..................... 60/226.2 |
| 8,015,797 | B2 | * | 9/2011 | Lair ............................. 60/226.2 |

FOREIGN PATENT DOCUMENTS

| | | |
|---|---|---|
| EP | 0 049 200 A1 | 4/1982 |
| EP | 1 236 881 A1 | 9/2002 |
| FR | 2 821 892 A1 | 9/2002 |
| GB | 2 116 129 A | 9/1983 |

* cited by examiner

*Primary Examiner* — William H Rodriguez
(74) *Attorney, Agent, or Firm* — Oblon, Spivak, McClelland, Maier & Neustadt, L.L.P.

(57) ABSTRACT

A turbomachine including at least one thrust reverser and a device for actuating the thrust reverser, which includes at least one hydraulic engine supplied with pressurized fluid by a fuel circuit of the turbomachine, is disclosed.

5 Claims, 3 Drawing Sheets

ACTUATING OF A THRUST REVERSER IN A TURBOMACHINE

This invention relates to a turbomachine, such as an aircraft turbojet, comprising a thrust reverser and means for actuating this thrust reverser.

BACKGROUND OF THE INVENTION

The thrust reverser of a turbojet is a system that makes it possible to deviate in the opposite direction a portion of the flow flowing in the turbojet, in order to brake the aircraft equipped with this turbojet. This deviation is obtained by the interposition of obstacles in the stream of the flow, these obstacles being displaced from a folded position to a deployed position by actuating means. For example, thrust reversers are known of the type with grids, doors, and clamshells.

In prior art, the means for actuating of a thrust reverser include one or several hydraulic actuators which are supplied with pressurized fluid by at least one hydraulic circuit of the aircraft which also supplies means for actuating components of the aircraft such as spoilers, air brakes, etc., used for the flight controls of this aircraft. The fluid pressure at the exit of this type of hydraulic circuit is relative substantial (for example of a magnitude of 200 bars), which makes it possible to use a relatively compact cylinder to manoeuvre the obstacles of the thrust reverser.

However, this technology has many disadvantages.

In the event of a failure of the hydraulic pump of the circuit, the thrust reverser can no longer be actuated. It may be necessary to provide a hydraulic accumulator in the nacelle of the turbomachine, this accumulator making it possible to store pressurised fluid and top release this fluid on demand in order to use the thrust reverser in the event of a pump breakdown.

In addition, the hydraulic fluid used (Skydrol® in general) is sensitive to the variations in temperature. When the surrounding temperature is low (minimum operating temperature less than −15° C.), the hydraulic fluid has substantial viscosity, which increases the time required to manoeuvre the thrust reverser for its deployment and its folding back. On the contrary, when the surrounding temperature is high (maximum operating temperature greater than 90° C.), the hydraulic fluid becomes acidic and high aggressive to certain materials, which can result in leaks and pollutions of the turbojet. In the event of a leak of this fluid, it is then no longer possible to control the thrust reverser and the components of the flight controls of the aircraft which are actuated by means of the same hydraulic circuit. This hydraulic fluid is moreover flammable and it is preferable to provide a fire stop device of the supply of the thrust reverser in order to prevent an engine fire in the event of a leak of this fluid.

The deployment or the folding back of the thrust reverser must be rapid (it lasts less than two seconds) and in general takes place during the landing of the aircraft at a moment when the components of the flight controls such as the spoilers and the air brakes as well as the landing gear are also actuated. The hydraulic circuit of the aircraft must be dimensioned to deliver a high enough flow of pressurised fluid to each of these elements, which results in a more involved hydraulic installation.

Means for actuating of a thrust reverser with an electric engine, or with pneumatic cylinder could be proposed but these technologies cannot be used for small engines, due to their mass and their cost.

SUMMARY OF THE INVENTION

The invention in particular has for purpose to provide a simple, effective and economical solution to the problems of prior art.

It proposes for this purpose a turbomachine, comprising at least one thrust reverser and means for actuating of this thrust reverser, wherein the means for actuating include at least one hydraulic cylinder or engine which is supplied with pressurised fluid by a fuel circuit of the turbomachine, and at least one mechanical cylinder, for example of the ball screw type, of which the rod is connected to the thrust reverser and of which the cylinder is driven in rotation by the output shaft of the hydraulic engine or by an additional shaft coupled to the output shaft of the hydraulic engine.

The means for actuating of the thrust reverser of the turbomachine are connected according to the invention to the fuel circuit of the turbomachine in such a way that the hydraulic circuit of the aircraft becomes independent of the operation of the thrust reverser and can be simplified, which results in a reduction in cost and in the mass of this hydraulic circuit.

The invention has other advantages. In the event of a failure with the pump of the hydraulic circuit, the operation of the means for actuating of the thrust reverser are not affected. The control of the thrust reverser can take place at any time as long as the turbomachine is operating.

The fuel is less sensitive to the variations in temperature than the hydraulic fluid. In the event of a low surrounding temperature, the fuel, which is generally used to cool the lubrication circuit of the engine, is reheated. The fuel can be used at a higher temperature and has a less problematic behaviour when hot than that of the aforementioned hydraulic fluid. In addition, the problem of engine fire is resolved as the aircraft is already equipped with a fire stop device blocking the supply of fuel.

The means for actuating include more preferably means of braking and/or of blocking in rotation of the output shaft of the hydraulic engine, of the additional shaft, and/or of the screw of each mechanical cylinder, these means of braking and of blocking being connected to means of manual and/or electrical control.

In this case, these means of braking and of blocking have an additional line of defence, supplementing the two other lines of defence, intended to prevent any untimely deploying of the thrust reverser in flight. These means are more preferably directly controlled by the pilot of the aircraft by means of an electric control.

At cruising speed for example, the means of blocking are activated in order to prevent the rotation of the drive shaft of the ball screws and in this way the deployment of the thrust reverser. This deploying in flight does not require any force of thrust or of traction since, if the flow of gas deviated by the thrust reverser in deployed position has a tendency to oppose the folding back of the reverser, it does on the contrary facilitate the deployment of the reverser from its folded position. The means of braking can then be used to prevent the shaft of the engine or the additional shaft from being driven in rotation by the force exerted by the flow of gas flowing in the turbomachine on the reverser. These means comprise for example a brake controlled by a solenoid valve and intended to cooperate with corresponding means provided on the output shaft of the engine or on the additional shaft.

The hydraulic engine can be connected to the fuel circuit by a control unit controlling the difference in pressure between the input and the output of the fluid of the hydraulic engine, the flow of fuel delivered to the hydraulic engine, and the direction of passage of the fuel in this engine. This control unit can be connected to the input and to the output of a high-pressure pump or in parallel of a dosing unit of the fuel circuit of the turbomachine.

This circuit also supplies fuel, in addition to the injectors of the combustion chamber of the turbomachine, actuators of elements with variable geometry such as variable pitch straightening vanes.

The control unit is more preferably connected to means of pressurisation and of flow generation, in such a way that, in the event of pressure or flow that is too low in the fuel circuit of the turbomachine (for example during a slow speed of the turbomachine), the means for actuating of the thrust reverser have the resources required in terms of pressure and of fluid flow for the manoeuvre of the reverser.

BRIEF DESCRIPTION OF THE DRAWINGS

The invention shall be better understood and other details, characteristics and advantages of this invention shall appear more clearly when reading the following description provided by way of a non-limiting example and in reference to the annexed drawings, wherein.

MORE DETAILED DESCRIPTION

Figure 1:
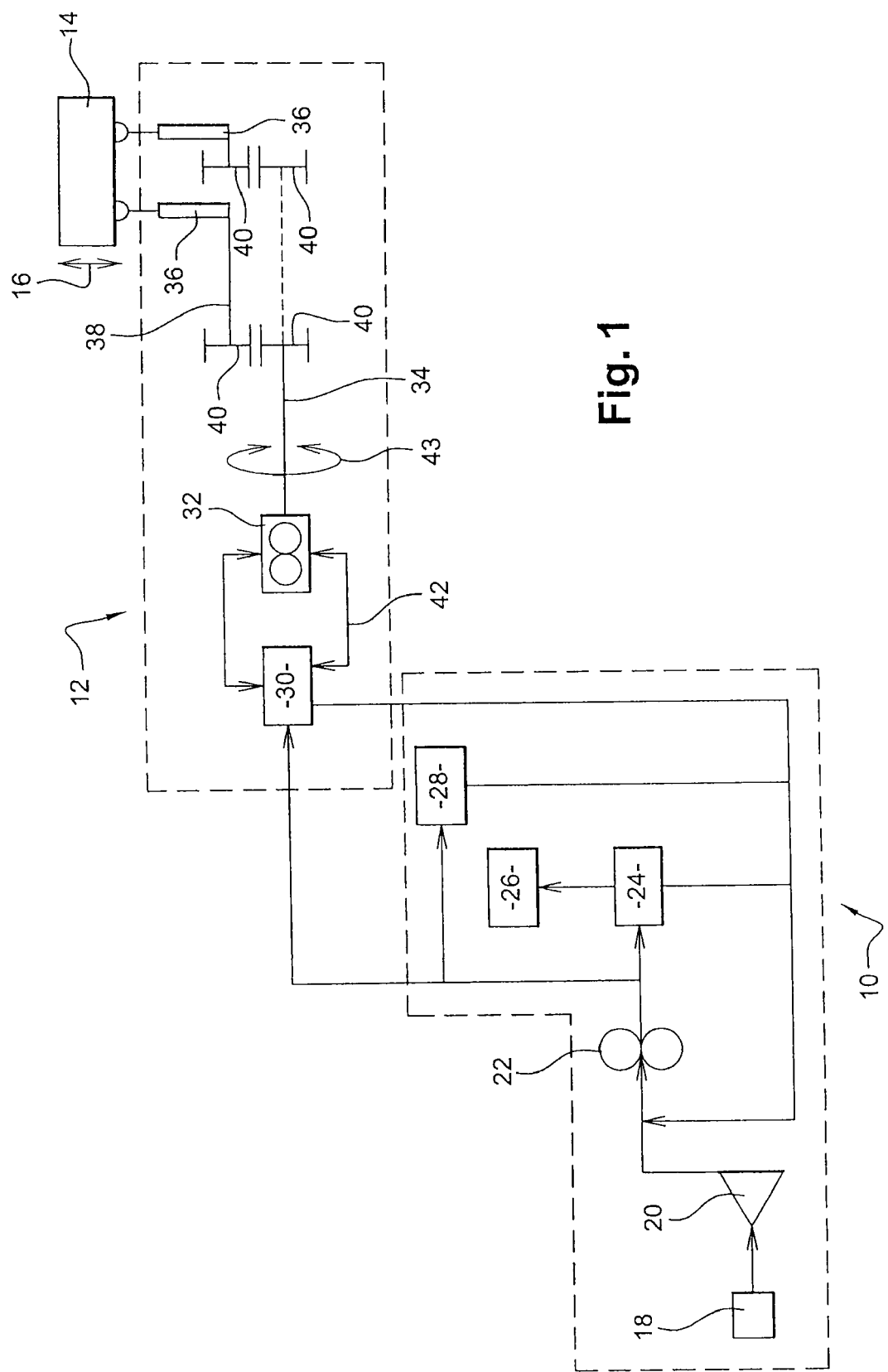
FIG. 1 shows very schematically means for actuating of a thrust reverser of a turbomachine according to the invention, these means for actuating being connected to the fuel supply circuit of this turbomachine.

FIG. 1 schematically shows a fuel supply circuit 10 of a turbomachine which is connected to the means 12 for actuating of a thrust reverser of the turbomachine. This turbomachine is for example a turbojet and comprises a thrust reverser of the type with grids, doors or clamshells.

The thrust reverser comprises one or several flaps 14 which are displaced by the means for actuating 12 between a deployed position and a folded position (arrow 16) in order to deviate or not deviate a portion of the secondary flow flowing in the turbomachine, such as is well known by those skilled in the art. The displacement of the flaps 14 can take place in translation or by pivoting around an axis.

The fuel supply circuit 10 substantially comprises a fuel tank 18 to which is connected the inlet of a low-pressure pump 20 of which the outlet supplies a high-pressure pump 22, for example a gear-type pump. This high-pressure pump 22 is driven mechanically by the turbomachine and its rotating speed is proportional to that of the turbomachine. The fuel flow and speed at the output of the pump 22 are determined by the rotation speed of this pump.

The output of the high-pressure pump 22 supplies a dosing unit 24 (FMU or Fuel Metering Unit) which makes it possible to dose the quantity of fuel sent to the fuel injectors 26 of the turbomachine according to the operation conditions. The pressure of the fuel at the output of the high-pressure pump 22 or of the dosing unit 24 is for example between 20 and 50 bars.

The pressure difference between the input and the output of the pump 22 is also used to control a set 28 of auxiliary equipment with variable geometry, comprising in particular actuators of variable pitch straightening vanes, as well as the means 12 for actuating of the thrust reverser.

These means for actuating 12 include a control unit 30 which controls the supply of a hydraulic engine 32 of which the output shaft 34 drives the deployment and the folding back of the flaps 14 of the thrust reverser by the intermediary of mechanical actuators 36.

The actuators 36 are of a number of one per flap 14 to manoeuvre and are for example of the ball screw type. They each include a rod or a screw solidly connected to the flap 14 and a cylinder driven in rotation directly by the output shaft 34 of the engine 32 or by an additional shaft 38 coupled to the hydraulic engine by suitable means 40 (such as gears for example), such as is shown in the drawing.

The hydraulic engine 32 comprises an inlet and an outlet of fluid which are connected to the control unit 30, this unit itself being connected to the inlet and to the outlet of fluid of the high-pressure pump 22.

The control unit 30 is continuously supplied with pressurised fuel by the high-pressure pump 22, of which the flow and the pressure at the output vary according to the speed of the turbomachine.

The control unit 30 has for function to control the difference in pressure between the inlet and the outlet of the hydraulic engine 32, the flow of fuel delivered to the hydraulic engine, and the direction of passage of the fuel in this engine (arrows 42) in such a way as to drive in rotation the shaft 34 of the engine in one direction or the other (arrow 43).

The means for actuating 12 according to the invention operate in the following manner. When a flap 14 of the thrust reverser must be deployed, to brake the aircraft equipped with the turbomachine, the control unit 30 controls the flow, the pressure and the direction of the fuel supplying the engine 32 in such a way that the output shaft of this engine rotates in the direction of deployments and transmits a determined torque. The rotating members of the actuators 36 are then driven in rotation directly by the shaft 34 or by the intermediary of the means of coupling 40 and of the additional shaft 38, in such a way that the rods of the actuators are deployed or retracted in order to manoeuvre in consequence the flap 14 of the reverser.

Figure 2:
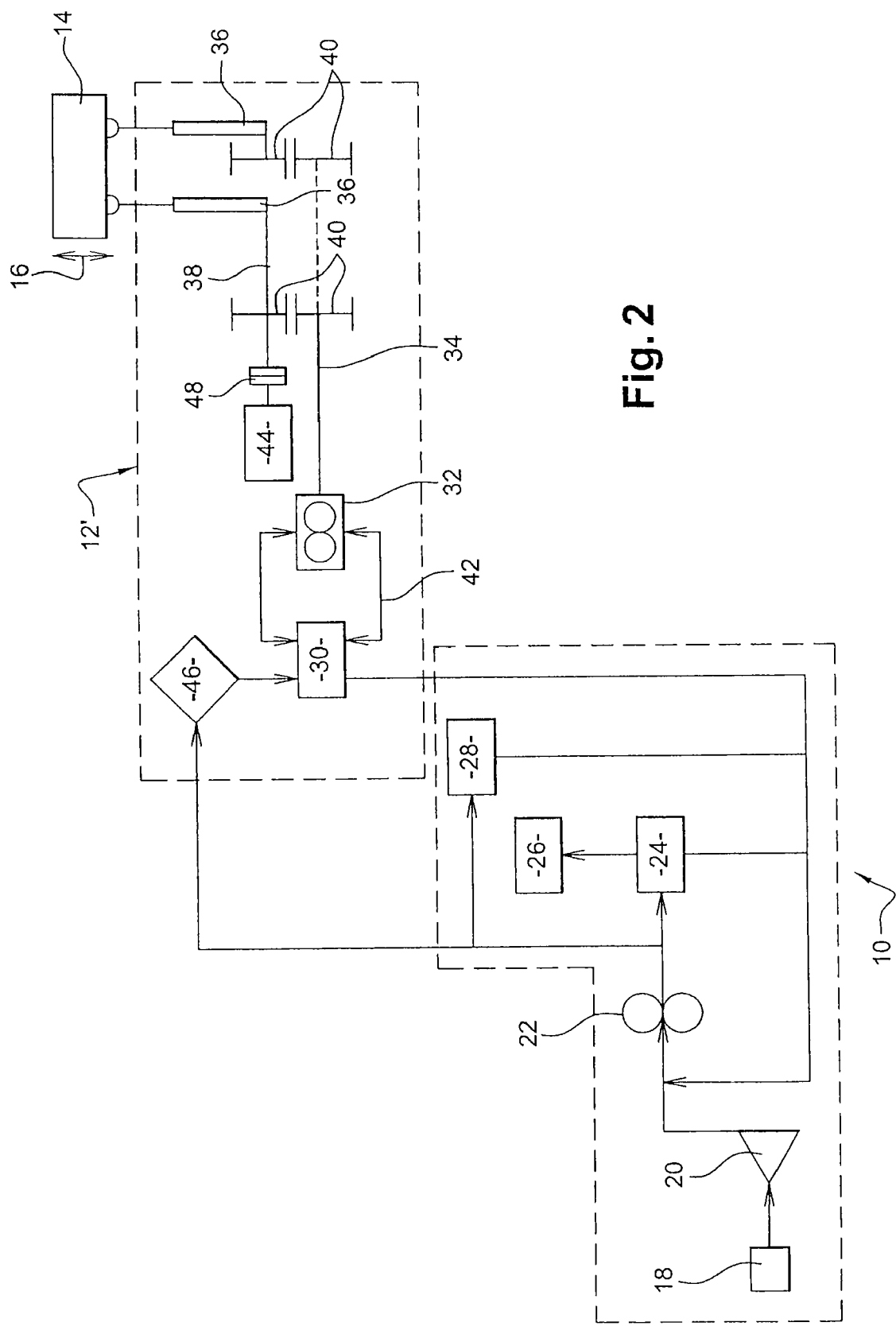
FIGS. 2 and 3 show very schematically alternative embodiments of the means for actuating of the thrust reverser.

In the alternative embodiment shown in FIG. 2, the means for actuating 12' of the thrust reverser further include means 44 of braking and of blocking of the rotation of the additional shaft 38, and means 46 of pressurising and of generating flow mounted between the control unit 30 and the output of the high-pressure pump 22.

The means 44 making it possible to brake the rotation of the shaft 38 or to lock it to prevent the latter from driving an undesired manoeuvre of the flaps 14 of the reverser in operation. The braking of the shaft 38 can be useful to reduce the speed of deployment of the flap 14 which has a tendency to be accelerated by the secondary flow flowing in the stream of the turbomachine. These means 44 can include a solenoid valve connected to a brake 48 comprising for example a friction lining, this brake 48 being intended to cooperate via tightening with the corresponding means of the shaft 38 in order to provide the braking and/or the blocking of this shaft. This brake 48 can alternatively cooperate with the output shaft 34 of the engine.

The means 46 making it possible to increase the pressure of the fuel supplying the control unit and as such to overcome any drop in pressure in the circuit 10 when the turbomachine and therefore the pump 22 are running slow. They comprise for example a pump and a pressurisation valve.

Figure 3:
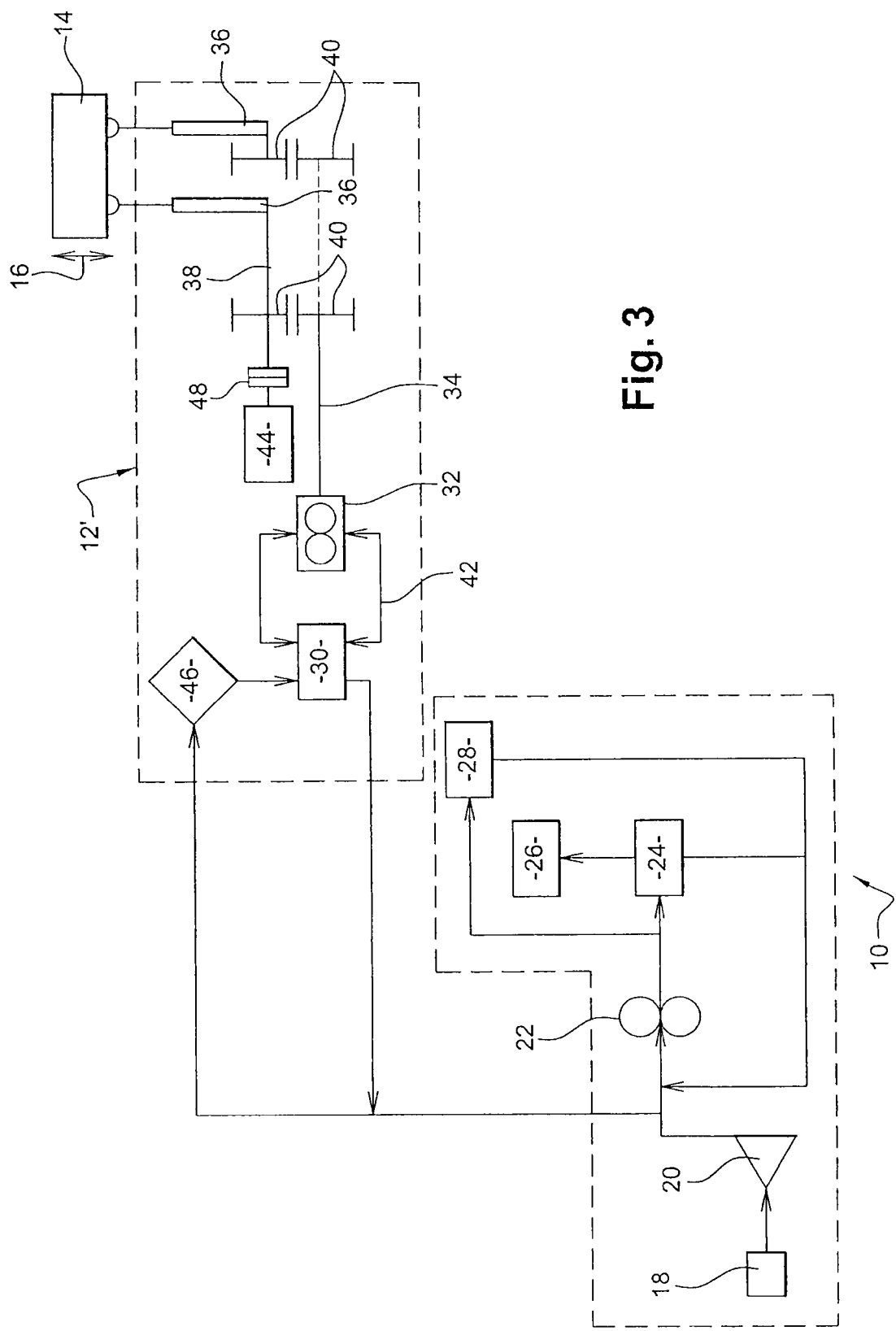

In the alternative shown in FIG. 3, the means 46 of pressurising and of generating flow are mounted in parallel of the high-pressure pump 22. The low-pressure pump 20 supplies the high-pressure pump 22 and the means 46, and the control unit 30 is connected to the inlet and to the outlet of the means 46.

The invention claimed is:

1. A turbomachine comprising:

at least one thrust reverser; and means for actuating the thrust reverser including at least one hydraulic engine and at least one mechanical cylinder, said at least one hydraulic engine being supplied with pressurized fluid by a fuel circuit of the turbomachine, and said at least one mechanical cylinder having a first end which is connected to the thrust reverser and a second end which is driven in rotation by an output shaft of said at least one hydraulic engine, wherein said at least one hydraulic engine is connected to the fuel circuit by a control unit controlling the difference in pressure between an inlet and an output of fluid of said at least one hydraulic engine, the flow of fuel delivered to said at least one hydraulic engine, and the direction of passage of the fuel in said at least one hydraulic engine.

2. The turbomachine set forth in claim 1, wherein said actuating means further includes means of braking and/or of blocking in rotation at least one of the output shaft of said at least one hydraulic engine or the first end of said at least one mechanical cylinder, the means of braking or of blocking being connected to at least one of manual or electrical means of control.

3. The turbomachine set forth in claim 1, wherein the control unit is connected to an inlet and to an outlet of a high-pressure pump or of a dosing unit of the fuel circuit of the turbomachine.

4. The turbomachine set forth in claim 1, wherein the control unit is connected to means of pressurizing and of generating fuel flow.

5. The turbomachine set forth in claim 1, wherein said second end of said at least one mechanical cylinder is driven by said output shaft either directly or by an intermediate shaft.

* * * * *